United States Patent [19]
Mizrahi

[11] Patent Number: 5,812,306
[45] Date of Patent: Sep. 22, 1998

[54] BIDIRECTIONAL WDM OPTICAL COMMUNICATION SYSTEMS WITH BIDIRECTIONAL OPTICAL AMPLIFIERS

[75] Inventor: Victor Mizrahi, Columbia, Md.

[73] Assignee: CIENA Corporation, Linthicum, Md.

[21] Appl. No.: 663,624

[22] Filed: Jun. 14, 1996

[51] Int. Cl.[6] .............................. H01S 3/00; H04B 10/16; H04J 14/02
[52] U.S. Cl. ............................................ 359/341; 359/143
[58] Field of Search .................................. 359/139, 134, 359/143, 160, 341; 385/1, 15

[56] References Cited

U.S. PATENT DOCUMENTS

| | | | |
|---|---|---|---|
| 5,280,549 | 1/1994 | Barnard et al. | 385/15 |
| 5,479,082 | 12/1995 | Calvani et al. | 359/127 |
| 5,500,763 | 3/1996 | Ota | 359/173 |
| 5,532,864 | 7/1996 | Alexander et al. | 359/177 |
| 5,557,442 | 9/1996 | Huber | 359/179 |
| 5,563,733 | 10/1996 | Mitsuda et al. | 359/341 |
| 5,633,741 | 5/1997 | Giles | 359/124 |
| 5,638,473 | 6/1997 | Byron | 385/37 |
| 5,652,675 | 7/1997 | Shibuya | 359/344 |

FOREIGN PATENT DOCUMENTS 535590  4/1993  European Pat. Off. .

OTHER PUBLICATIONS

Chawbi et al, 21st Eurgren Conf. on Opt. Commun., vol. 1, pp. 47–50, Sep. 21, 1995; abst. only herewith.
Barnard et al, IEEE Photonics Tech. Lett., vol. 4, No. 8, Aug. 1992, pp. 911–913; abst. only herewith.

Primary Examiner—Nelson Moskowitz
Attorney, Agent, or Firm—Margaret Burke; Daniel N. Daisak

[57] ABSTRACT

The present invention provides a bidirectional WDM optical communication system with bidirectional optical amplifiers for optically amplifying two counter-propagating WDM optical signals. The bidirectional system includes two sets of optical transmitters for respectively creating a set of west-east optical channels and a set of counter-propagating east-west optical channels. The respective channel sets are multiplexed by optical combiners and output to an optical transmission path. A bidirectional optical amplifier positioned in the optical transmission path amplifies the west-east and east-west WDM signals. In an exemplary embodiment, the amplifier includes at least two optical circulators with at least first, second, and third circulating ports. A gain block interconnects the circulators for optically amplifying the WDM signals. Bragg gratings configured to reflect either the west-east or the east-west channel band are positioned in optical paths which optically communicate with the optical circulators. The bidirectional WDM optical system further includes two receiving systems for demultiplexing the WDM signals and routing the individual optical channels to their respective receivers.

17 Claims, 4 Drawing Sheets

BIDIRECTIONAL WDM OPTICAL COMMUNICATION SYSTEMS WITH BIDIRECTIONAL OPTICAL AMPLIFIERS

BACKGROUND OF THE INVENTION

1. Field of the Invention

The present invention relates to bidirectional WDM optical communication systems and, more particularly, bidirectional WDM optical communication systems incorporating bidirectional optical amplifiers for simultaneously optically amplifying two WDM optical communication signals travelling in opposite directions over the same optical transmission path.

2. Description of the Related Art

Optical communication systems are a substantial and fast-growing constituent of communication networks. The expression "optical communication system," as used herein, relates to any system which uses optical signals to convey information across an optical waveguiding medium. Such optical systems include, but are not limited to, telecommunications systems, cable television systems, and local area networks (LANs). Optical systems are described in Gowar, Ed. Optical Communication Systems, (Prentice Hall, N.Y.) c. 1993, the disclosure of which is incorporated herein by reference. Currently, the majority of optical communication systems are configured to carry an optical channel of a single wavelength over one or more optical waveguides. To convey information from plural sources, time-division multiplexing is frequently employed (TDM). In time-division multiplexing, a particular time slot is assigned to each information source, the complete signal being constructed from the signal portions created for each time slot. While this is a useful technique for carrying plural information sources on a single channel, its capacity is limited by fiber dispersion and fiber nonlinearities.

While the need for communication services increases, the current capacity of existing waveguiding media is limited. Although capacity may be expanded, e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of fiber optic networks. A WDM system employs plural optical signal channels, each channel being assigned a particular channel wavelength. Since each channel can itself carry plural information sources via time division multiplexing, additional optical channels increase capacity over a single channel system in proportion to the number of channels. For example, a four-channel WDM optical system has 400% of the capacity of a conventional single channel system. In a WDM system, signal channels are generated, multiplexed, and transmitted over a waveguide. At the receiving end, the WDM optical signal is demultiplexed such that each channel wavelength is individually routed to a designated receiver. Through the use of optical amplifiers, such as doped fiber amplifiers, plural optical channels are directly amplified simultaneously, facilitating the use of WDM systems in long-distance optical systems.

In some optical system topologies, it may be advantageous to employ bidirectional optical transmission paths, e.g., a single optical waveguide carrying two counter-propagating optical signals. For such systems to be optically amplified, the optical amplifiers must be configured to amplify both of the counter-propagating optical signals. In U.S. Pat. No. 5,452,124, entitled "Unidirectional Amplification For Bidirectional Transmission Using Wavelength-Division Multiplexing," the disclosure of which is incorporated herein by reference, a single erbium-doped fiber amplifier is used to optically amplify two counter-propagating optical signals having two different wavelengths. A single four-port wavelength division multiplexer or, alternatively, a configuration of plural three-port wavelength division multiplexers, is used to route the two optical signals in a single direction through the erbium-doped fiber amplifier.

Due to the dichroic optical filters employed in the optical amplifiers of the '124 patent, the disclosed configurations are disadvantageous for use in bidirectional WDM systems, particularly in dense bidirectional WDM optical systems in which the optical channel spacing is approximately one nanometer or less. Because the multilayer interference filters of the '124 do not exhibit spectrally sharp transmission profiles, a substantial guard band (in which no optical channel can be positioned) is required to prevent crosstalk between counter-propagating optical channels. This guard band can be many nanometers wide, reducing the potential capacity of a WDM system by numerous channels. Further, the filter transmission profiles may permit amplification of undesired optical signals, increasing noise and the possibility of crosstalk between counter-propagating channels or leading to instabilities in the amplifier.

Accordingly, there is a need in the art for improved bidirectional amplifiers for use in optical communication systems. In particular, there is a need in the art for improved bidirectional optical amplifiers configured for amplification of counter-propagating wavelength division multiplexed optical communication signals.

SUMMARY OF THE INVENTION:

The present invention provides a bidirectional WDM optical communication system with bidirectional optical amplifiers for optically amplifying two counter-propagating WDM optical signals. The bidirectional system includes two sets of optical transmitters for respectively creating a set of west-east optical channels and a set of counter-propagating east-west optical channels. The respective channel sets are multiplexed by optical combiners and output to an optical transmission path. A bidirectional optical amplifier positioned in the optical transmission path amplifies the west-east and east-west WDM signals. In an exemplary embodiment, the amplifier includes at least two optical circulators with at least first, second, and third circulating ports. A gain block interconnects the circulators for optically amplifying the WDM signals. Bragg gratings configured to reflect either the west-east or the east-west channel band are positioned in optical paths which optically communicate with the optical circulators. The bidirectional WDM optical system further includes two receiving systems for demultiplexing the WDM signals and routing the individual optical channels to their respective receivers.

Figure 1:
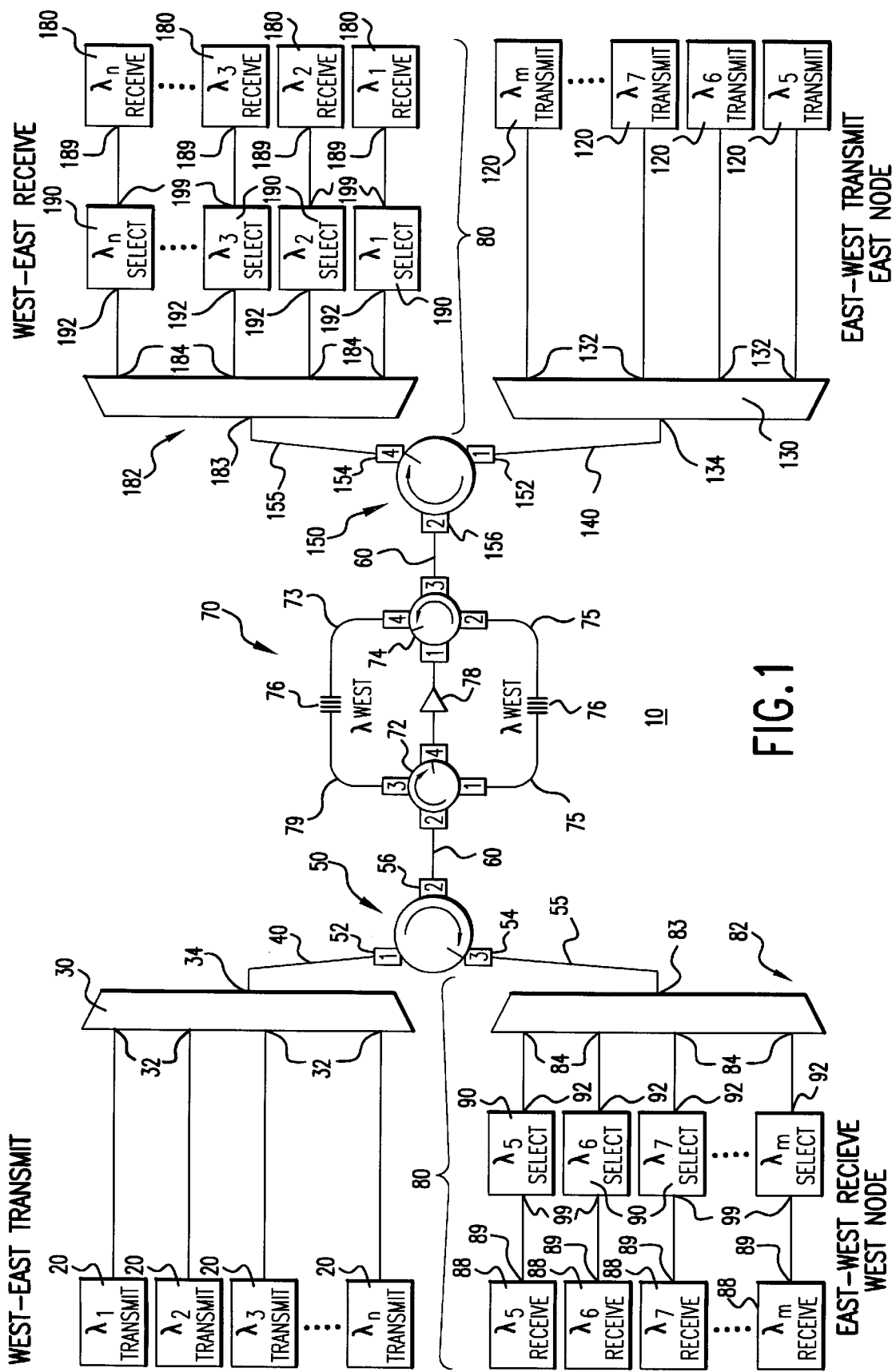
FIG. 1 schematically depicts a bidirectional WDM optical communication system with a bidirectional optical amplifier according to one embodiment of the present invention.

DETAILED DESCRIPTION:

Turning to the drawings in detail in which like numerals indicate the same or similar elements in each of the figures, FIG. 1 depicts a bidirectional optical communication system 10 according to the present invention. Wavelength division multiplexed optical communication system 10 includes a plurality of west-east optical transmitters 20 and a plurality of east-west optical transmitters 120. The terms "west-east" and "east-west," as used herein, denote opposite transmission directions in an optical communication system, regardless of the actual geographic direction in which the signals are travelling. Accordingly, optical transmitters launching "east-west" optical signals are positioned at an opposing side of an optical transmission path to optical transmitters launching "west-east" optical signals. Conventionally, the transmission node on the left side of FIG. 1 is designated the "west" node, while the transmission node on the right side of FIG. 1 is designated the "east" node.

Each optical transmitter 20 and each optical transmitter 120 emits an information-bearing optical signal at a transmission wavelength. The expression "information -bearing optical signal," as used herein, refers to an optical signal which has been coded with information, including, but not limited to, audio signals, video signals, and computer data. As depicted in FIG. 1, optical transmitters 20 deliver wavelengths $\lambda_1$ $\lambda_2$ $\lambda_3$ through $\lambda_n$ corresponding to optical channels 1, 2, 3 through n while optical transmitters 120 deliver wavelengths $\lambda_5$ $\lambda_6$ $\lambda_7$ through $\lambda_m$ corresponding to optical channels 5, 6, 7 through m. It is understood that the bidirectional wavelength division multiplexed optical systems of the present invention use a variety of a channel plans and are not limited by the eight-channel bidirectional system depicted in FIG. 1. Typically, the smallest number of optical channels in a bidirectional WDM optical system is four, with two channels launched in the west-east direction and two channels launched in the east-west direction. However, the configurations of the present invention are also useful for systems in which a single channel is launched in each direction. It is further understood that the letters "m" and "n" designate the largest channel number in each direction and are any whole number, particularly, m is a whole number with a value of two or larger and n is a whole number with a value of four or larger.

The optical channel wavelengths emitted by the transmitters are located within the gain spectrum of the optical amplifiers employed in the bidirectional system. In an exemplary dense bidirectional WDM embodiment, the west-east optical channel wavelengths emitted by transmitters 20 occupy a contiguous spectral region at the shorter wavelength end of the amplifier gain spectrum. The east-west optical channels emitted by transmitters 120 occupy a contiguous spectral region at the longer wavelength region of the amplifier gain spectrum. When rare-earth doped fibers are used as the gain medium of the amplifiers, the system spectrum is typically within a range of approximately 1530 nm to 1560 nm, with the west-east spectral portion occupying 1530–1545 nm and the east-west spectral portion occupying 1546–1560 nm. However, it is understood that the system spectrum within which the optical transmitter wavelengths are located can correspond to the gain spectrum of any optical amplifiers. Consequently, when using amplifiers with a gain spectrum in a different region, the optical transmitters output wavelengths within that gain spectrum. Additionally, the optical channel wavelengths are selected to correspond to wavelengths selected by selection components and/or devices of the optical receiving system.

Each optical transmitter 20, 120 generally includes a laser, such as a DFB semiconductor laser, a laser controller, and a modulator for creation of the information-bearing optical signal. In an exemplary embodiment, the transmitter laser is a DFB semiconductor diode laser, generally comprising one or more III–V semiconductor materials, commercially available from a wide variety of suppliers such as Fujitsu, GEC Marconi, Spectra Diode Laboratories, Alcatel, and Hewlett-Packard. The laser outputs an optical carrier signal at a particular channel wavelength corresponding to a demultiplexer wavelength included in a receiving system. The laser controller provides the required laser bias current as well as thermal control of the laser. Using thermal control, typically responsive to feedback information from an appropriate wavelength reference, the precise operating wavelength of the laser is maintained, typically to less than an angstrom bandwidth. Exemplary techniques for maintaining the precise operating wavelength of a laser are described in co-pending, commonly-assigned U.S. patent application Ser. No. 08/605,856, filed Feb. 23, 1996 (Attorney's Docket No. 107 mab), now U.S. Pat. No. 5,673,129, the disclosure of which is incorporated by reference herein.

The optical transmitters each include a modulator for imparting information to the optical carrier signal. An exemplary modulator is an external modulator, such as a Mach-Zehnder modulator, employing a waveguiding medium whose refractive index changes according to the applied electrical field, i.e., a material exhibiting an electro-optic effect. In the Mach-Zehnder configuration, two optical interferometer paths are provided. An incoming optical carrier is split between the two optical paths. At least one path of the interferometer is phase modulated. When the signal is recombined at the output, the light from the paths either constructively or destructively interferes, depending upon the electrical field applied to the surrounding electrodes during the travel time of the carrier, creating an amplitude-modulated output optical signal.

When optical transmitters 20 and 120 form part of an existing optical system, a plurality of remodulators can be employed. Such remodulators operate to map a space division optical communication system, i.e., a system in which individual optical signals are physically separated in space by transmission on separate waveguides, onto a wavelength division optical communication system, i.e., a communication system in which individual optical signals are simultaneously transmitted in the same waveguide by receiving an information-bearing optical signal at an input and outputting an optical channel having a carrier wavelength corresponding to a demultiplexer wavelength in a WDM optical system. The use of optical remodulators ensures compatibility of optical communication system 10 with currently-deployed transmission equipment. Further description of wavelength division multiplexed optical communication systems with remodulators is found in U.S. Pat. No. 5,504,609, the disclosure of which is incorporated by reference herein.

The optical channels output from transmitters 20 are brought together in optical combiner 30 from input ports 32 for conveyance to output optical waveguide 40 through output port 34. Similarly the optical channels output from transmitters 120 are brought together in optical combiner 130 from input ports 132 for conveyance to output optical waveguide 140 through output port 134. Optical combiners 30, 130 are selected from any passive optical component which can combine plural wavelengths into a single output medium. Frequently, optical splitters used to divide a signal among plural outputs are used as optical combiners, operated in reverse fashion from the splitter. Exemplary optical combiners include 1×N wideband single mode splitters available from IOT Integrierte Optik GmbH, Waghausel-Kirrlach, Germany, and fused fiber combiners available from Gould, Inc., Millersville, Md.

The combination of channels output by transmitters 20 forms a west-east wavelength division multiplexed optical signal which is input to directional optical coupler 50 through coupler input port 52. Similarly, the combination of channels output by transmitters 120 forms an east-west wavelength division multiplexed optical signal which is input to directional optical coupler 150 through coupler input port 152. Couplers 50, 150 are typically three-port optical circulators, as depicted in FIG. 1. In the three-port optical circulator, optical signals which enter circulator port 1 are output to circulator port 2, while optical signals which enter circulator port 2 are output to circulator port 3. In this manner, optical signals are rotated through the optical circulator in the illustrated circulating direction. Exemplary optical circulators include those commercially available from JDS-Fitel, Canada, and E-Tek, San Jose, Calif.

Using this circulator configuration, the west-east WDM optical signal enters coupler 50 through port 52, exiting through port 56 onto transmission path 60 while the east-west WDM optical signal enters coupler 50 through port 56 and exits through port 54 toward the east-west receiving system 80. Similarly, the east-west WDM optical signal enters coupler 150 through port 152 and exits through port 156 onto optical transmission path 60 while the west-east WDM optical signal enters coupler 150 through port 156 and exits through port 154 toward the west-east receiving system 180.

Optical transmission path 60 is typically a single-mode optical fiber such as SMF-28, available from Corning, or TRUEWAVE, available from AT&T Corp./Lucent Technologies, and is the principal transmission medium for the optical communication system. However, any optical waveguide which is capable of transporting multiple optical wavelengths can be employed as transmission path 60 in optical system 10.

Interposed along transmission path 60 is one or more bidirectional optical amplifier 70. While not shown in FIG. 1, it is understood that plural bidirectional optical amplifiers 70 can be positioned along optical transmission path 60. Typically, when WDM optical communication system 10 is used as a long-haul interexchange carrier route, transmission path 60 is on the order of hundreds of kilometers long with optical amplifiers spacings on the order of every 100 kilometers, with a range of 30–130 kilometers being exemplary. Bidirectional amplifiers 70 can also be used as pre- and post-amplifiers in the optical communication system. Amplifier 70 comprises first and second directional optical couplers 72, 74, grating reflector sets 76 and one or more gain blocks 78.

Directional optical couplers 72 and 74 generally comprise the depicted four-port optical circulators. Exemplary optical circulators are commercially available from JDS-Fitel and E-Tek. In the illustrated four-port configuration, the optical signals input to the first circulator port exit the circulator at the second port. Optical signals input to the second port exit the circulator at the third port and optical signals input to the third port exits the circulator at the fourth port. Any optical signals which enter the fourth port (e.g., through Rayleigh scattering) are terminated within the circulator. In the depicted bidirectional amplifier 70, port 2 of optical circulator 72 and port 3 of optical circulator 74 communicate with transmission path 60. Port 2 of optical circulator 72 receives the west-east WDM optical signal from transmission path 60 while port 3 of optical circulator 74 receives the east-west WDM optical signal from transmission path 60.

An optical path 73 optically communicates with port 3 of circulator 72 for receiving optical signals originating from circulator port 2. Optical path 73 terminates at port 4 of optical circulator 74. Interposed along optical path 73 is Bragg grating set 76. Similarly, an optical path 75 optically communicates with port 2 of circulator 74 for receiving optical signals input at port 3. Optical path 75 terminates at port 1 of optical circulator 72. An additional Bragg grating set 76 is positioned in optical path 75. Preferably, Bragg grating sets 76 comprise one or more Bragg gratings configured to reflect one or more optical signals. In an exemplary embodiment, each Bragg grating is an in-fiber grating comprising series of photoinduced refractive index perturbations in an optical fiber which reflect optical signals within a selected wavelength band. Bragg gratings suitable for use in the optical system of the present invention known in the art and are described, inter alia, in Morey et al., "Photoinduced Bragg Gratings in Optical Fibers," Optics and Photonics News, February 1994, pp. 8–14, the disclosure of which is incorporated by reference herein. In the depicted embodiment, Bragg grating sets 76 are configured to reflect optical signals in the west-east spectral band. Alternatively, Bragg grating sets 76 are configured to reflect optical signals in the east-west spectral band.

In an exemplary embodiment, each Bragg grating set 76 comprises a single grating which reflects the entire spectral region of the WDM signal for one propagating direction (e.g., a single grating reflecting the band from 1530–1545 nm for the west-east WDM signal or reflecting the band from 1546–1560 nm for the east west WDM signal). When one or a small number of gratings are employed, broad, chirped gratings are selected. Alternatively, grating set 76 comprises plural Bragg gratings, each of which is configured to reflect one or more optical channels.

As is known in the art, strong gratings, i.e., gratings which reflect over 95% of the incident design wavelength, generally include a radiation mode loss band on the short wavelength side of the transmission/reflection spectrum. See, for example, U.S. Pat. Nos. 5,457,760 and 5,475,780 to Mizrahi, the disclosures of which are incorporated by reference herein. The expression "radiation mode loss" describes any optical signal loss due to scattering outside the core of the waveguide, including radiation scattered in the cladding of the waveguide, and is caused by the grating presence within the core, and not the cladding, of the optical waveguide. Consequently, it is desirable to ensure that optical channels are not located within the radiation mode loss region for grating set 76.

To ensure that no optical channels will pass through the radiation mode loss region for grating set 76, the west-east optical channels reflected by the grating are selected to have shorter wavelengths than the east-west optical channels which, as described below, are transmitted through the grating. In this manner, the transmitted signal wavelengths will all pass through the grating transmission region at wavelengths longer than the reflected wavelengths, i.e., the region in which there is no radiation mode loss associated with the grating. Alternatively, when grating set 76 is configured to reflect optical signals within the east-west spectral band, the east-west optical channels are selected to have shorter wavelengths that the west-east optical channels which are transmitted through the gratings.

It is noted that although the above grating/channel configuration is exemplary, the converse configuration (in which long wavelengths are reflected by the grating and short wavelengths are transmitted through the grating) is an operative embodiment. This is particularly true for systems in which there are small numbers of channels whose wavelengths can be located outside the radiation mode loss region, or when radiation mode loss is acceptable or minimized through known techniques, such as those described in the '760 and '780 patents incorporated by reference above or as described in Delevaque et al., "Optical Fiber Design For Strong Gratings Photoimprinting With Radiation Mode Suppression" (OFC 1995, post-deadline paper 5, pp. PD5-2-PD5-5, c. 1995), the disclosure of which is incorporated by reference herein.

As stated previously, grating set 76 alternatively comprises a series of gratings, each grating configured to reflect one or more channels within the desired spectral region. This configuration advantageously reduces the problem of radiation mode loss since narrow gratings exhibit proportionally less radiation mode loss than strong, wide, gratings. When a series of gratings is used, the gratings are ordered such that the shortest channel wavelength is reflected first, in order up to the longest channel wavelength, to eliminate radiation mode loss effects during reflection.

Interconnecting the fourth port of circulator 72 and the first port of circulator 74 is gain block 78 which produces optical gain in the optical transmission signals that traverse the fiber. As described below in connection with FIG. 2, gain block 78 is selected from a number of devices and/or components and can have a variety of configurations. In an exemplary embodiment, gain block 78 is a rare-earth doped fiber amplifier.

In operation, the west-east WDM optical signal (the "west" signal) enters port 2 of circulator 72. As the west WDM signal exits circulator 72 through port 3, it is placed on optical path 73 where it encounters grating set 76 and is reflected back toward circulator port 3. The west signal re-enters circulator 72 through port 3 and is output through port 4. The west WDM signal is optically amplified as it traverses gain block 78. The amplified west WDM signal enters the second optical circulator 74 through port 1 and is output through port 2. As the west WDM signal exits circulator 74 through port 2, it is placed on optical path 75 and reflected back towards port 2 by grating 76. The west WDM optical signal is subsequently output through port 3 of circulator 74 and placed onto optical transmission path 60 to continue travelling toward the east node.

The east-west WDM optical signal (the "east" signal) enters circulator 74 from optical transmission path 60 through circulator port 3. The east WDM signal exits through port 4 and traverses optical path 73 (unimpeded by grating 76) and enters circulator 72 through port 3. The east WDM signal is passed through to port 4 where it exits towards gain block 78 for optical amplification. Following amplification, the east optical signal enters circulator 74 through port 1, exiting through port 2 onto optical path 75. The amplified east optical signal traverses optical path 75, (unimpeded by grating 76) and enters circulator 72, through port 1, exiting through port 2 onto optical transmission path 60 to continue propagation toward the west node.

As stated previously, gain block 78 is selected from any component or device which produces optical gain to incident optical signals. Typically, gain block 78 is selected from doped fiber amplifiers, semiconductor amplifiers, and Raman amplifiers. In an exemplary embodiment, gain block 78 is the multiple-stage rare-earth-doped fiber gain block 78 depicted in FIG. 2. Gain block includes a first and second amplifier stages 161 and 162. Each of the first and second stages includes a length of doped optical waveguide in which the dopant is selected from materials which can produce laser action in the waveguide. Such materials include rare earth dopants such as erbium, neodymium, praseodymium, ytterbium, or mixtures thereof. Pumping of the doped waveguide at a specific pump wavelength causes population inversion among the electron energy levels of the dopant, producing optical amplification of the wavelength division multiplexed optical signals. For doped fiber amplifiers employing erbium as the dopant, a wavelength band between approximately 1530 nm and approximately 1565 nm is the useful gain region for incident optical signals when the doped fiber is pumped. In the gain block of FIG. 2, exemplary erbium-doped fiber 161 is commercially available from Alcatel, Corning, Inc., AT&T Corp./Lucent Technologies, Lycom, and Furukawa Corp.

Figure 2:
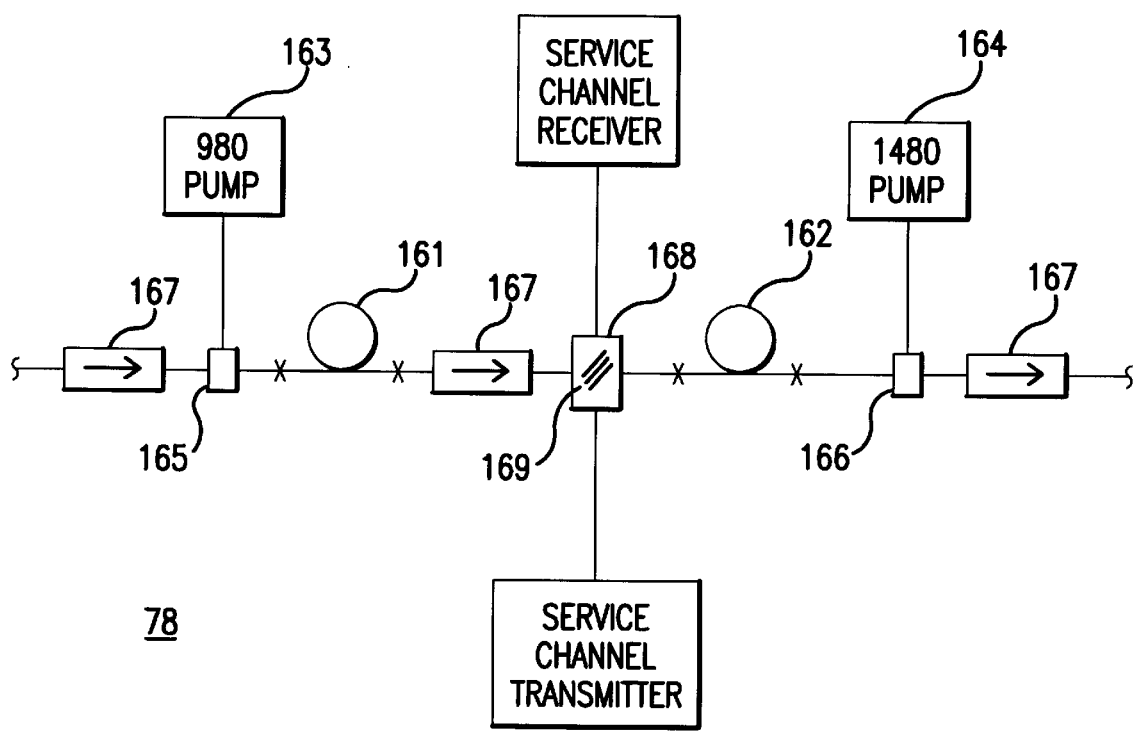
FIG. 2 schematically depicts portions of a gain block configuration useful in the bidirectional optical amplifier of FIG. 1.

In the optical amplifier of FIG. 2, pump connection elements 165 and 166 are provided to connect each stage of the amplifier with a source of optical pumping energy. Pump connection elements 165 and 166 are typically wavelength selective multiplexers which permit pump radiation to enter the doped fiber sections without allowing transmission channel radiation to pass into the pump. Optical pumping elements are generally selected from 980 and 1480 nm laser sources. In one embodiment, a 980 nm pump, depicted as element 163, can be used to pump the first stage of the amplifier while a 1480 nm pump, depicted as element 164, is used to pump the second stage of the amplifier. A single laser source, comprising single or multiple laser diodes, can be used to pump both fiber sections or to pump two amplifier stages located in separate optical amplifiers. Alternatively, separate laser sources, having the same or different pumping wavelengths, can be used to pump each fiber section. Further description of amplifier pumping schemes suitable for use in the wavelength division multiplexed optical communication system of the present invention is found in Bjarklev, Optical Fiber Amplifiers: Design and System Applications, (Artech House, Norwood, Mass.), c. 1993, the disclosure of which is incorporated herein by reference. Although the above-described pumping arrangements are exemplary, any pumping configuration which supplies sufficient power to the optical amplifier stages to create the desired gain can be used in the optical communication systems of the present invention.

To provide ASE noise suppression, isolator 167 is optionally positioned between the first and second amplifier stages. The amplifier stages are interconnected through interconnection element 168, selected to be a four-port wavelength division multiplexer. Multiplexer 168 includes at least one wavelength selective member 169 for selecting one or more optical service channels to enter and exit the communication system. Wavelength selective member 169 can be a multilayer thin film interference filter constructed to reflect an optical monitoring channel, particularly an optical service channel having a wavelength outside the gain band of the doped-fiber amplifier. Optionally, the interconnection element 168 includes means for selectively passing a particular wavelength range. In an exemplary embodiment, interconnection element selects wavelengths which are 1540 nm and above. The multilayer thin film interference filters 169 employed in the optical amplifiers of the present invention are commercially available from JDS-Fitel, Canada.

In an exemplary embodiment, member 169 is configured to reflect optical signals having a wavelengths of 1625 nm or greater, a wavelength band outside the gain band of the selected erbium fiber. An optical channel in this band is used as an optical monitoring/service channel and a service channel transmitter/receiver communicates with the interconnection element for sending and detecting this channel. The payload optical channels, i.e., those WDM signal channels having wavelengths within the gain band of the optical amplifier, pass through wavelength selective member 169 unaffected. For the depicted system configuration, the service channel is launched from the east node.

While the interconnection element 168 is depicted as a multilayer interference filter, it is understood that a variety of interconnection elements can be positioned between the first and second amplifier stages, depending upon the overall WDM system configuration. For example, interconnection element 168 can be selected from optical circulators which include devices such as Bragg gratings configured for ASE reduction, as described in U.S. Pat. 5,283,626, the disclosure of which is incorporated herein by reference. Alternatively, other optical filtering elements can be used for interconnection element 168 depending upon wavelengths desired to pass through to the second amplifier stage. Additional elements may be used in conjunction with gain block 78 such as the depicted isolators 167 at the amplifier input and output which exclude reflected optical signals. Other two-stage amplifier configurations which can be employed in the present invention are disclosed in U.S. patent application Ser. No. 08/457,292, now U.S. Pat. No. 5,532,864, and Ser. No. 08/554,976, now U.S. Pat. No. 5,696,615, assigned to the instant assignee, the disclosures of which is incorporated by reference herein. Additional amplifiers and rare-earth doped fiber amplifier configurations useful for gain block 78 are disclosed in Bjarklev, Optical Fiber Amplifiers, and Gowar, Optical Communication Systems, both incorporated by reference above.

Following transmission and amplification, the west-east WDM optical signal enters coupler 150 through port 156, exiting onto output path 155 through output port 154. Similarly, the east-west WDM optical signal enters coupler 50 through port 56, exiting onto output path 55. Following output of the WDM optical signals by couplers 50, 150, each channel must be demultiplexed and routed to the receiver designated for the particular channel. This function is performed by west-east receiving system 180 and east-west receiving system. It is understood that the depicted receiving systems are exemplary; any system which can receive a multiplexed optical signal, demultiplex the signal into the constituent optical channels, and route the individual channels to their respective receivers can be employed as the receiving systems 80, 180 in the optical communication systems of the present invention.

In the depicted receiving systems 80, 180, the multiplexed signals are input to optical splitters 82, 182 respectively through input ports 83, 183. The optical splitters place a portion of the multiplexed signals onto each of plural output paths 84, 184. Each output path 84, 184 optically communicates with a demultiplexer wavelength selector system 90, 190. Optical splitters 82, 182 are selected from optical devices which can divide an input optical signal and place it onto plural output paths. Exemplary splitters include passive optical components such as those components described for use as optical combiners 30, 130.

Figure 3:
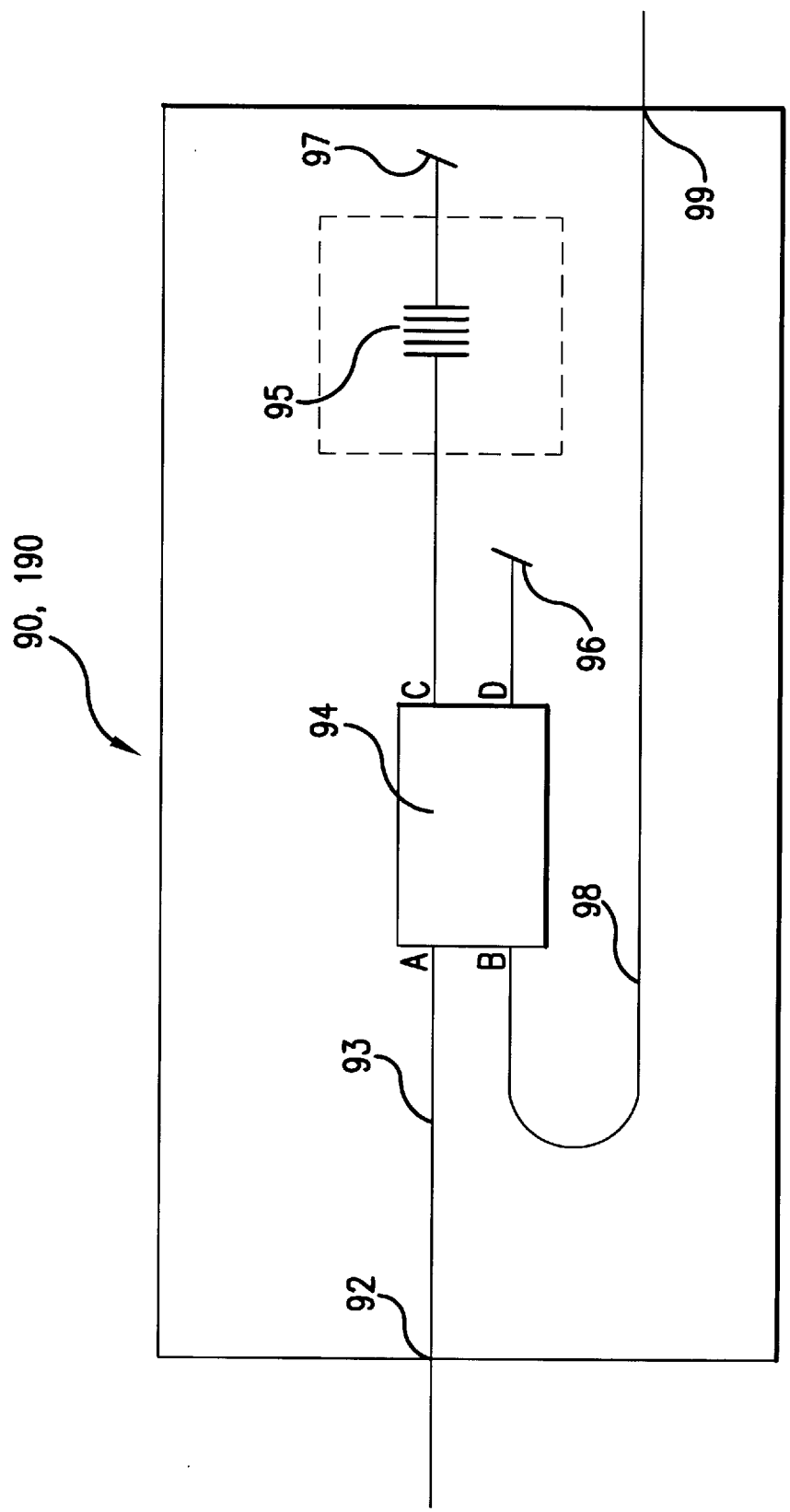
FIG. 3 schematically depicts a wavelength selector for use in the bidirectional WDM system of FIG. 1.

Turning to FIG. 3, a detailed schematic representation of wavelength selectors 90, 192 is presented. While the wavelength selector elements are depicted with reference numerals directed only to wavelength selectors 90, it is understood that substantially similar components are found in wavelength selector 190. The output portions of the WDM optical signals from splitters 82, 182 enter each of wavelength selectors 90, 190 through input ports 92, 192 and are placed onto optical path 93. Optical path 93, typically an optical fiber, passes the WDM signal into coupler 94. Coupler 94 is typically a 3 dB fused fiber coupler. The WDM optical signal entering coupler 94 through port A is equally divided between output ports C and D. The portion of the optical signal exiting the coupler through port D passes through low reflectivity port 96 and exits the optical system. The low reflectivity port 96 is typically an angled fiber cut, although any low reflectivity waveguide termination technique may be employed.

The portion of the WDM optical signal which exits coupler 94 through port C encounters optical filter 95. The optical filter passes optical signals having wavelengths other than the channel wavelength to be sent to the optical channel receiver. These non-selected channels pass through low reflectivity port 97 and exit the optical communication system. The channel wavelength is reflected by optical filter 95 to be routed towards the optical receiver back through coupler 94, exiting onto optical path 98 through coupler port B. In an exemplary embodiment, optical filter 95 is a Bragg grating configured to reflect a particular optical channel. Although the above-described in-fiber Bragg gratings are exemplary optical filters, it is understood that other types of Bragg gratings can be employed as optical filter 95, including, but not limited to, bulk gratings, e.g., photoinduced refractive index perturbations in bulk optical media. Thus, as used herein, the term "Bragg gratings" encompasses in-fiber, waveguide, and bulk versions of these optical components. Since each wavelength selector 90,192 selects a designated optical channel to be routed to the respective optical receiver, each Bragg grating reflects a different optical channel. The selected optical channels exit wavelength selectors 90, 190 through selector output ports 99, 199.

While the above splitter/wavelength selector configuration is exemplary, it is understood that any demultiplexer configuration may be used to separate the individual optical channels from the WDM optical signals. Other demultiplexer configurations for use in the present invention include those described in U.S. Pat. Nos. 5,457,760 and 5,475,780, incorporated by reference above, demultiplexers based on wavelength routers, commercially available from AT&T Corp./Lucent Technologies, Fabry-Perot demultiplexers, and interference filter demultiplexers.

Following selection by the wavelength selectors, the channel wavelengths are input to their respective optical receivers 88, 188 through receiver inputs 89, 189. Optionally, the signal may be optically amplified before it reaches the receiver. The optical receiver generally detects the optical signal and converts it to an electrical signal, typically through the use of a photodiode device. Various optical receivers suitable for use in optical system 10 are described in Gowar, Optical Communication Systems, discussed above. In optical communication system 10, the receiver will frequently be part of an existing optical communication system to which the optical channel is routed. Consequently, the optical system 10 can function with numerous types of receivers to ensure compatibility with existing optical equipment.

Figure 4:
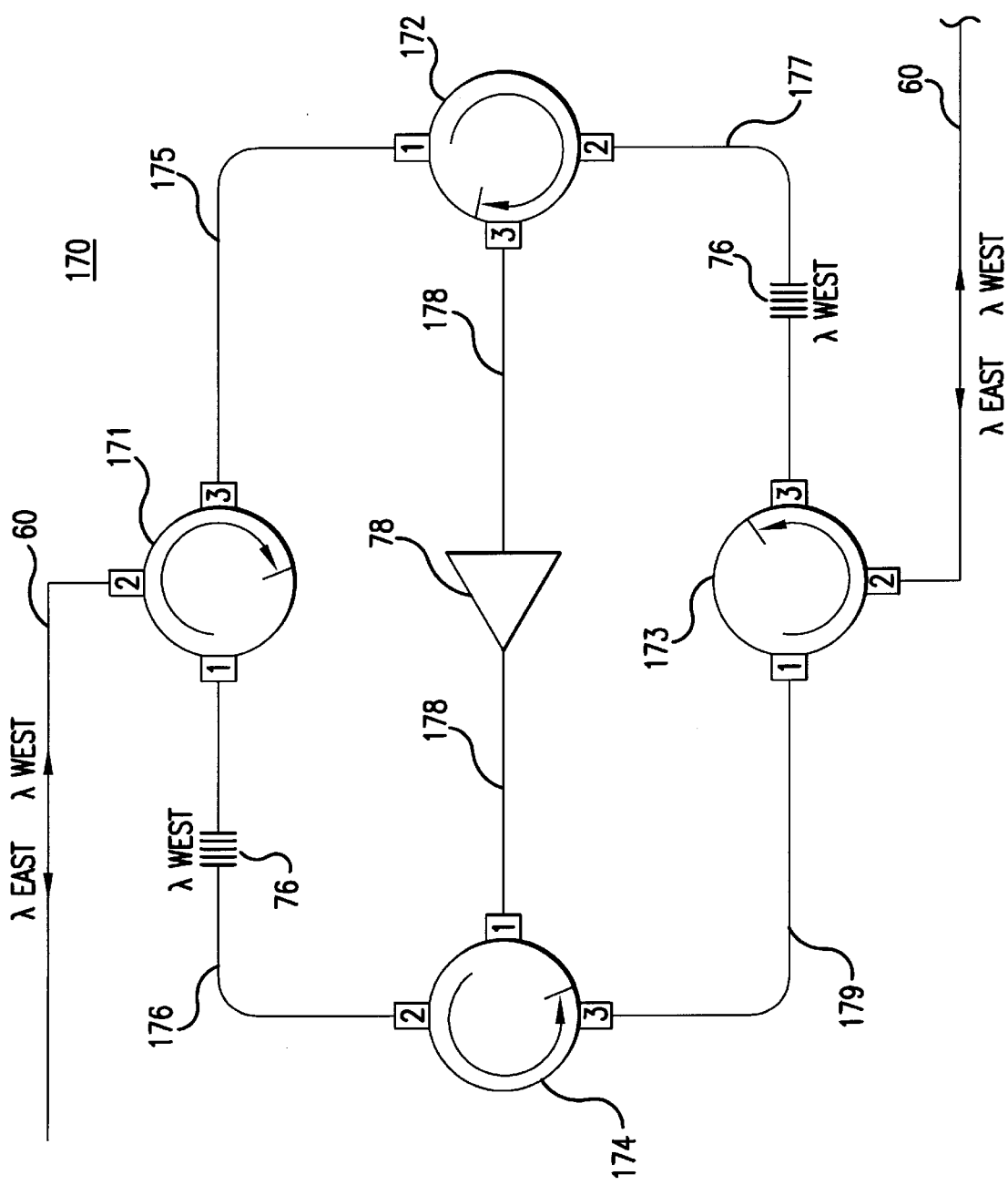
FIG. 4 schematically depicts a further embodiment of a bidirectional optical amplifier for use in a bidirectional WDM optical communication system.

FIG. 4 depicts a further embodiment of a bidirectional optical amplifier according to the present invention. Bidirectional optical amplifier 170 comprises four three-port optical circulators 171, 172, 173, and 174, grating reflectors 76 and gain block 78. Exemplary three-port optical circulators are commercially available from JDS-Fitel and E-Tek. In the three-port configuration, the optical signals input to the first circulator port exit the circulator at the second port. Optical signals input to the second port exit the circulator at the third port. Optical signals which inadvertently enter the third port (e.g., from Rayleigh scattering) are terminated within the circulator.

In bidirectional amplifier 170, port 2 of optical circulator 171 and port 2 of optical circulator 173 communicate with transmission path 60. Port 2 of optical circulator 171 receives the west-east WDM optical signal from transmission path 60 while port 2 of optical circulator 171 receives the east-west WDM optical signal from transmission path 60. An optical path 175 optically communicates with port 3 of circulator 171 for receiving optical signals originating from circulator port 2. Optical path 175 terminates at port 1 of optical circulator 172. Optical path 177 optically communicates with port 2 of circulator 172 for receiving optical signals from circulator port 1 and terminates at port 3 of circulator 173. Interposed along optical path 177 is Bragg grating set 76. Bragg grating set 76 is substantially similar to grating set 76 of FIG. 1 and comprises, in an exemplary embodiment, one or more Bragg gratings configured to reflect optical signals in the west-east spectral band. Similarly, optical path 176, having a grating set 76 positioned therein, optically communicates with port 1 of circulator 171 and port 2 of circulator 174.

Interconnecting the third port of circulator 172 and the first port of circulator 174 is optical path 178 having gain block 78 positioned therein. As in the amplifier 70 of FIG. 1, gain block 78 produces optical gain in the optical transmission signals traversing optical path 178 and is selected from the various optical gain configurations discussed in connection with FIG. 2, above. Optical path 179 interconnects the third port of circulator 174 with the first port of circulator 173.

It should be noted that any two of the three-port optical circulators 171, 172, 173, and 174 can be replaced by a single six-port circulator, with the same amplifier function.

In operation, the west-east WDM optical signal (the "west" signal) enters port 2 of circulator 171. As the west WDM signal exits circulator 171 through port 3, it traverses optical path 173 and enters circulator 172 through port 1. As the west signal exits circulator 172 through port 2 and is placed on optical path 177, it encounters grating set 76 and is reflected back toward circulator port 2 of circulator 172. The west signal re-enters circulator 172 through port 2 and is output through port 2. When the west signal exits through the third port onto optical path 178, it is optically amplified as it traverses gain block 78. The amplified west WDM signal enters the optical circulator 174 through port 1 and is output through port 2. As the west WDM signal exits circulator 174 through port 2, it is placed on optical path 176 and reflected back towards port 2 by grating 76. The west WDM optical signal re-enters circulator 174 through port 2 and is subsequently output through port 3 onto optical path 179. The west optical signal then enters circulator 173 through port 1 where it is circulated to port 2 and output through port 2 onto optical transmission path 60 to continue travelling toward the east node.

The east-west WDM optical signal (the "east" signal) enters circulator 173 from optical transmission path 60 through circulator port 2. The east WDM signal exits through port 3 and traverses optical path 177 (unimpeded by grating set 76) entering circulator 172 through port 2. The east WDM signal is circulated to port 3, output onto optical path 178, and is optically amplified as it traverses gain block 78.

Following amplification, the east optical signal enters circulator 174 through port 1, exiting through port 2 onto optical path 176. The amplified east optical signal traverses optical path 176, (unimpeded by grating 76) and enters circulator 171, through port 1, exiting through port 2 onto optical transmission path 60 to continue propagation toward the west node.

While the foregoing invention has been described in terms of the embodiments discussed above, numerous variations are possible. Accordingly, modifications and changes such as those suggested above, but not limited thereto, are considered to be within the scope of following claims.

What is claimed is:

1. A bidirectional optical amplifier comprising:
   at least first and second optical circulators having at least first, second, and third circulator ports, the first optical circulator optically communicating with a first optical signal source which provides a first set of one or more optical channels and the second optical circulator optically communicating with a second optical signal source which provides a second set of one or more optical channels, the first and second sets of optical channels comprising different optical wavelengths;
   a plurality of optical paths optically communicating with the at least first and second optical circulators;
   at least one optical gain block positioned in one of said plurality of optical paths;
   first and second optical selector sets positioned in two of the plurality of optical paths, the optical selector sets configured to reflect either the first set of one or more optical channels or the second set of one or more optical channels such that both the first and second sets of optical channels traverse the optical gain block in the same direction.

2. A bidirectional optical amplifier as recited in claim 1 wherein the first and second optical circulators comprise four-port optical circulators.

3. A bidirectional optical amplifier as recited in claim 2 wherein the first and second optical selector sets comprise one or more Bragg gratings configured to reflect either the first set of one or more optical channels or the second set of one or more optical channels.

4. A bidirectional optical amplifier as recited in claim 1 wherein the at least first and second optical circulators comprise four three-port optical circulators.

5. A bidirectional optical amplifier as recited in claim 4 wherein the first and second optical selector sets comprise one or more Bragg gratings configured to reflect either the first set of one or more optical channels or the second set of one or more optical channels.

6. A bidirectional optical amplifier as recited in claim 1 wherein the first and second optical circulators comprise six-port optical circulators.

7. A bidirectional wavelength division multiplexed optical communication system comprising:
   a first plurality of optical transmitters for transmitting a plurality of optical communication signals in a first, nominally west-east, direction;
   a first optical combiner having inputs for communicating with each of the west-east optical transmitters and an output for outputting a west-east wavelength division multiplexed optical communication signal comprised of the plurality of west-east optical communication signals;
   an optical transmission path including nominally west and east access ports having a west access port optically communicating with the output port of the first optical combiner for receiving the west-east wavelength division multiplexed optical communication signal;

a second plurality of optical transmitters for transmitting a plurality of optical communication signals in a second, nominally east-west, direction;

a second optical combiner having inputs for communicating with each of the east-west optical transmitters and an output for outputting an east-west wavelength division multiplexed optical communication signal comprised of the plurality of east-west optical communication signals, the output of the second optical combiner optically communicating with an east access port of the optical transmission path;

a bidirectional optical amplifier optically communicating with the optical transmission path for optically amplifying the west-east wavelength division multiplexed optical communication signal and for optically amplifying the east-west wavelength division multiplexed optical communication signal, the bidirectional optical amplifier comprising:

a first optical circulator having first, second, third, and fourth circulator ports, the second port of the first optical circulator optically communicating with the optical transmission path to receive the west-east wavelength division multiplexed optical communication signal;

a second optical circulator having first, second, third, and fourth circulator ports, the third port of the second optical circulator optically communicating with the optical transmission path to receive the east-west wavelength division multiplexed optical communication signal;

a first set of one or more Bragg gratings configured to reflect optical wavelengths within the west-east wavelength division multiplexed optical communication signal optically communicating with the first and second optical circulators;

a second set of one or more Bragg gratings configured to reflect optical wavelengths within the west-east wavelength division multiplexed optical communication signal optically communicating with the first and second optical circulators;

at least one gain block optically communicating with the first and second optical circulators and the first and second sets of one or more Bragg gratings for amplifying the west-east and east-west wavelength division multiplexed optical communication signals such that the west-east and east-west wavelength division multiplexed optical communication signals traverse the optical gain block in the same direction; and first and second receiving systems optically communicating with the optical transmission path for respectively receiving the west-east and east-west wavelength division multiplexed optical communication signals.

8. A bidirectional wavelength division multiplexed optical communication system as recited in claim 7 in which the optical channels which comprise the west-east wavelength division multiplexed optical communication signal all have shorter wavelengths than the wavelengths of the optical channels which comprise the east-west wavelength division multiplexed optical communication signal.

9. A bidirectional wavelength division multiplexed optical communication system as recited in claim 7 wherein the first and second sets of one or more Bragg gratings each comprise a single Bragg grating configured to reflect an entire west-east spectral band.

10. A bidirectional wavelength division multiplexed optical communication system as recited in claim 7 wherein the first and second sets of Bragg gratings each comprise fewer Bragg gratings than optical channels in the west-east and east-west wavelength division multiplexed optical communication signals.

11. A bidirectional wavelength division multiplexed optical communication system as recited in claim 7 wherein the gain block is selected from rare-earth doped fibers communicating with an optical pumping source.

12. A bidirectional wavelength division multiplexed optical communication system as recited in claim 11 wherein the gain block comprises an erbium-doped optical fiber connected to an optical pump.

13. A bidirectional wavelength division multiplexed optical communication system comprising:

a first plurality of optical transmitters for transmitting a plurality of optical communication signals in a first, nominally west-east, direction;

a first optical combiner having inputs for communicating with each of the west-east optical transmitters and an output for outputting a west-east wavelength division multiplexed optical communication signal comprised of the plurality of west-east optical communication signals;

an optical transmission path including nominally west and east access ports having a west access port optically communicating with the output port of the first optical combiner for receiving the west-east wavelength division multiplexed optical communication signal;

a second plurality of optical transmitters for transmitting a plurality of optical communication signals in a second, nominally east-west, direction;

a second optical combiner having inputs for communicating with each of the east-west optical transmitters and an output for outputting an east-west wavelength division multiplexed optical communication signal comprised of the plurality of east-west optical communication signals, the output of the second optical combiner optically communicating with an east access port of the optical transmission path;

a bidirectional optical amplifier optically communicating with the optical transmission path for optically amplifying the west-east wavelength division multiplexed optical communication signal and for optically amplifying the east-west wavelength division multiplexed optical communication signal, the bidirectional optical amplifier comprising:

a first optical circulator having first, second, third, and fourth circulator ports, the second port of the first optical circulator optically communicating with the optical transmission path to receive the west-east wavelength division multiplexed optical communication signal;

a second optical circulator having first, second, third, and fourth circulator ports, the third port of the second optical circulator optically communicating with the optical transmission path to receive the east-west wavelength division multiplexed optical communication signal;

a first set of one or more Bragg gratings configured to reflect optical wavelengths within the east-west wavelength division multiplexed optical communication signal optically communicating with the third port of the first optical circulator and with the fourth port of the second optical circulator;

a second set of one or more Bragg gratings configured to reflect optical wavelengths within the east-west wavelength division multiplexed optical communication signal optically communicating with the second port of the second optical circulator and the first port of the first optical circulator;

at least one gain block optically communicating with the fourth port of the first optical circulator and with the first port of the second optical circulator for amplifying the west-east and east-west wavelength division multiplexed optical communication signals;

first and second receiving systems optically communicating with the optical transmission path for respectively receiving the west-east and east-west wavelength division multiplexed optical communication signals.

14. A bidirectional wavelength division multiplexed optical communication system as recited in claim 13 in which the optical channels which comprise the east-west wavelength division multiplexed optical communication signal all have shorter wavelengths than the wavelengths of the optical channels which comprise the west-east wavelength division multiplexed optical communication signal.

15. A bidirectional wavelength division multiplexed optical communication system as recited in claim 13 wherein the first set of one or more Bragg gratings comprises a single Bragg grating configured to reflect an entire east-west spectral band.

16. A bidirectional wavelength division multiplexed optical communication system as recited in claim 13 wherein the gain block is selected from rare-earth doped fibers communicating with an optical pumping source.

17. A bidirectional wavelength division multiplexed optical communication system as recited in claim 16 wherein the gain block comprises an erbium-doped optical fiber connected to an optical pump.

* * * * *